US011922597B2

(12) United States Patent
Wu et al.

(10) Patent No.: US 11,922,597 B2
(45) Date of Patent: Mar. 5, 2024

(54) VIDEO PROCESSING METHOD AND APPARATUS, READABLE MEDIUM, AND ELECTRONIC DEVICE

(71) Applicant: BEIJING YOUZHUJU NETWORK TECHNOLOGY CO. LTD., Beijing (CN)

(72) Inventors: Hao Wu, Beijing (CN); Yuntao Ma, Beijing (CN); Changhu Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/253,357

(22) PCT Filed: Nov. 16, 2021

(86) PCT No.: PCT/CN2021/130875
§ 371 (c)(1),
(2) Date: May 17, 2023

(87) PCT Pub. No.: WO2022/105740
PCT Pub. Date: May 27, 2022

(65) Prior Publication Data
US 2023/0394625 A1 Dec. 7, 2023

(30) Foreign Application Priority Data
Nov. 18, 2020 (CN) .......................... 202011298813.5

(51) Int. Cl.
*G06T 3/40* (2006.01)
*G06T 7/70* (2017.01)
(Continued)

(52) U.S. Cl.
CPC .................. *G06T 3/40* (2013.01); *G06T 7/70* (2017.01); *G06V 20/41* (2022.01); *G06V 20/46* (2022.01);
(Continued)

(58) Field of Classification Search
CPC ... G06T 3/40; G06T 7/70; G06T 2207/10016; G06T 2207/30201; G06V 20/41; G06V 20/46; G06V 20/49; G11B 27/34
See application file for complete search history.

(56) References Cited

U.S. PATENT DOCUMENTS 6,633,651 B1  10/2003 Hirzalla et al.
2006/0257048 A1  11/2006 Lin et al.
(Continued)

FOREIGN PATENT DOCUMENTS

CN  101594529 A  * 12/2009  ......... H04N 21/4126
CN  102541494 A    7/2012
(Continued)

OTHER PUBLICATIONS

ISA China National Intellectual Property Administration, International Search Report Issued in Application No. PCT/CN2021/130875, dated Feb. 8, 2022, WIPO, 4 pages.
(Continued)

*Primary Examiner* — Girumsew Wendmagegn
(74) *Attorney, Agent, or Firm* — Alleman Hall & Tuttle LLP

(57) ABSTRACT

The present disclosure relates to a video processing method and apparatus, a readable medium, and an electronic device, which relate to the technical field of image processing; the method includes: preprocessing a target video to obtain a plurality of target image frames of the target video; identifying a position of a designated object in each of the target image frames; and determining a reserved image frame from
(Continued)

the target image frames based on the position of the designated object in each of the target image frames, the reserved image frame being used to indicate a cropping on image frames before the reserved image frame in the target video.

20 Claims, 14 Drawing Sheets

(51) Int. Cl.
    *G06V 20/40*     (2022.01)
    *G11B 27/34*     (2006.01)

(52) U.S. Cl.
    CPC .............. *G06V 20/49* (2022.01); *G11B 27/34* (2013.01); *G06T 2207/10016* (2013.01); *G06T 2207/30201* (2013.01)

(56) References Cited

U.S. PATENT DOCUMENTS

| | | | |
|---|---|---|---|
| 2007/0120979 | A1 | 5/2007 | Zhang et al. |
| 2007/0217685 | A1 | 9/2007 | Kaneko et al. |
| 2007/0274595 | A1 | 11/2007 | Kaneko et al. |
| 2009/0251594 | A1 | 10/2009 | Hua et al. |
| 2016/0381306 | A1 | 12/2016 | Yang et al. |

FOREIGN PATENT DOCUMENTS

| | | |
|---|---|---|
| CN | 104126299 A | 10/2014 |
| CN | 106231399 A | 12/2016 |
| CN | 106797499 A | 5/2017 |
| CN | 108230594 A | 6/2018 |
| CN | 109068150 A | 12/2018 |
| CN | 109690471 A | 4/2019 |
| CN | 110189378 A | 8/2019 |
| CN | 111010590 A | 4/2020 |
| CN | 111652043 A | 9/2020 |
| CN | 111881755 A | 11/2020 |
| CN | 112423021 A | 2/2021 |
| JP | 2014123908 A | 7/2014 |
| WO | 2020073860 A1 | 4/2020 |

OTHER PUBLICATIONS

China National Intellectual Property Administration, Office Action and Search Report Issued in Application No. 202011298813.5, dated Apr. 22, 2022, 8 pages.

Yinqiao, S.,"Research on Object Detection and Content Recommendation in Short Video based on Deep Learning," A Thesis in Partial Fulfillment of the Requirement for the M.S Degree in Communication & Information System, Postgraduate Program, College of Physical Science and Technology, Central China Normal University, Apr. 2018, 83 pages. Submitted with English abstract.

Liu, D. et al., "Spatio-temporal Video Object Segmentation Using Moving Detection and Graph Cut Methods," Proceedings of 2011 Seventh International Conference on Natural Computation, 2011, Shanghai, China, 4 pages.

* cited by examiner

VIDEO PROCESSING METHOD AND APPARATUS, READABLE MEDIUM, AND ELECTRONIC DEVICE

CROSS-REFERENCE TO RELATED APPLICATIONS

This application is a national stage of the International application PCT/CN2021/130875, filed on Nov. 16, 2021, which claims the benefit of priority to the Chinese patent application No. 202011298813.5 filed on Nov. 18, 2020, which is hereby incorporated by reference in its entirety into the present application.

TECHNICAL FIELD

The present disclosure relates to the technical field of image processing, in particular to a video processing method and apparatus, readable medium, and electronic device.

BACKGROUND

With the continuous development of terminal technology and electronic information technology, terminal devices have become increasingly important in our daily lives. People can obtain information through various applications installed on terminal devices. Therefore, advertisers often place video ads within applications. There are several display methods for video ads, comprising open screen display, which is a common ad display method that plays video ads when users open applications.

Video ads displayed in open screen mode are usually divided into two parts: a first part that occupies the entire screen of the terminal device, i.e., is displayed in full-screen mode to highlight the information comprised in the first part, and a second part that is displayed according to the original size of the video ad. The first part is to be displayed in full-screen mode, so it is necessary to crop the image frames in the original video in advance to adapt the cropped image frames to the display size of the terminal device.

SUMMARY

This summary is provided for a concise introduction of the inventive concept of the present application, which will be described in detail in the Detailed Description below. This summary is not intended to identify critical features or essential features of the claimed technical solution, nor is it intended to be used to limit the scope of the claimed technical solution.

According to a first aspect of some embodiments of the present disclosure, there is provided a video processing method, comprising:
  preprocessing a target video to obtain a plurality of target image frames of the target video;
  identifying a position of a designated object in each of the target image frames; and
  determining a reserved image frame from the target image frames based on the position of the designated object in each of the target image frames, the reserved image frame being used to indicate a cropping on image frames before the reserved image frame in the target video.

According to a second aspect of some embodiments of the present disclosure, there is provided a video processing apparatus, comprising:
  a preprocessing module for preprocessing a target video to obtain a plurality of target image frames of the target video;
  an identification module for identifying a position of a designated object in each of the target image frames; and
  a first determination module for determining a reserved image frame from the target image frames based on the position of the designated object in each of the target image frames, the reserved image frame being used to indicate a cropping on image frames before the reserved image frame in the target video.

According to a third aspect of some embodiments of the present disclosure, there is provided a non-transitory computer-readable storage medium on which a computer program is stored, wherein the program when executed by a processor carries out the steps of the method described in the first aspect of the present disclosure.

According to a fourth aspect of some embodiments of the present disclosure, there is provided an electronic device, comprising:
  one or more processors; and
  a memory for storing one or more programs,
  which when executed by the one or more processors cause the one or more processors to implement any one of the aforementioned video processing methods.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale. In the drawings.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

A video ad may comprise image frames that are not suitable for cropping, and cropping these frames can result in a significant loss of information and an inability to communicate effective information to users. Some embodiments of the present invention provide a video processing method for reducing information loss during the cropping process of target videos.

Figure 1:
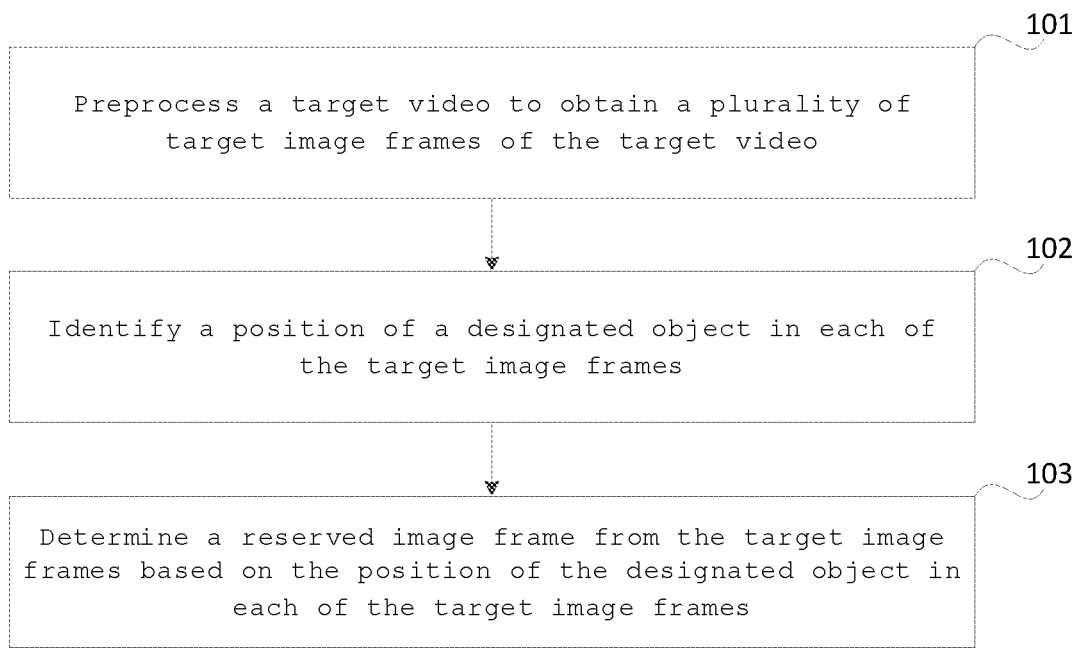
FIG. 1 is a flowchart of a video processing method according to an exemplary embodiment.

FIG. 1 is a flowchart of a video processing method according to an exemplary embodiment. As shown in FIG. 1, the method comprises the following steps 101-103.

In step 101, a target video is preprocessed to obtain a plurality of target image frames of the target video.

For example, a terminal device or a server may be a subject of execution of the embodiments of this disclosure, or some steps may be executed on a terminal device while the other steps are executed on a server, which is not limited in this disclosure. Firstly, a target video is determined. The target video may be a video shot by a user (such as an advertiser or individual user), or a video selected by a user through browsing a multimedia resource library (which may be stored on a terminal device or a server), or a video uploaded by a user to the Internet. The target video can be acquired by means of its identification code or URL (Uniform Resource Locator) address. After acquisition of the target video, the target video may be preprocessed to obtain a plurality of target image frames of the target video. Preprocessing may comprise, for example, extracting image frames from the target video to obtain the plurality of target image frames. For example, if the target video comprises 1000 image frames, 200 image frames are extracted as the target image frames. The preprocessing may further comprise a noise reduction process for the image frames contained in the target video to remove noise from the image frames and obtain the target image frames. The preprocessing may further comprise a border removal process for the image frames comprised in the target video to remove the borders which do not carry any information to obtain the plurality of target image frames. The preprocessing may further comprise extracting image frames and then performing a noise reduction process, a border removal process, etc., on the extracted image frames to obtain the plurality of target image frames. It should be noted that the target image frames may be all the image frames of the target video, or a portion of the image frames of the target video, which is not limited in the present disclosure.

In step 102, a position of a designated object in each of the target image frames is identified.

In step 103, a reserved image frame is determined from the target image frames based on the position of the designated object in each of the target image frames, the reserved image frame being used to indicate a cropping on image frames before the reserved image frame in the target video.

For example, each target image frame can be recognized according to a preset image recognition algorithm to identify a position of a designated object in each of the target image frames after acquiring the target image frames. The designated object can be considered as a main content to be presented in the target video, or a content to be highlighted, for example, it can comprise at least one of a face, text, a designated identifier, or a salient object. The designated identification can be a user-specified watermark, trademark, etc., and the salient object can be interpreted as an object that occupies a large proportion of the target image frame. Finally, a reserved image frame is selected from the plurality of target image frames based on the position of the designated object in each of the target image frames to indicate cropping of the image frames in the target video that are before the reserved image frame. The reserved image frame can be considered as a position where the target video will be cropped, or a dividing point between a video displayed in full-screen mode (referred to below as the first video) and a video displayed in its original size (referred to below as the second video), and the image frames in the target video that are located before the reserved image frames are suitable for cropping. It should be noted that after determining the reserved image frame in step 103, this method may further comprise: cropping the target video based on the reserved image frame to divide the target video into a full-screen video and an original video, and then controlling the full-screen video to be displayed in full-screen mode, and controlling the original video to be displayed in its original size. The full-screen video consists of cropped image frames before the reserved image frame, and the original video consists of the reserved image frame and various image frames after the reserved image frame.

In some embodiments, the method of determining a reserved image frame may comprise, for example, sequentially comparing an area ratio of the designated object in each target image frame with a preset area threshold. If the area ratio is greater than an area threshold, it indicates that the target image frame has high importance (i.e., more information is conveyed) and is not suitable for cropping; if the area ratio is less than or equal to the area threshold, it indicates that the target image frame is less important (i.e. less information is conveyed) and is suitable for cropping. Then, an image frame with a smallest sequence number among the target image frames with higher importance is used as the reserved image frame, wherein frame sequence numbers are used to represent orders of the target image frames in the target video. As a method of determining the reserved image frame, the position of the designated object in each target image frame can be sequentially compared with a preset cropping position. If the designated object is within the cropping position, this indicates that the designated object can still be fully displayed if the target image frame is cropped, and is therefore suitable for cropping. If the designated object is outside the cropping position, this indicates that the designated object will not be visible to the user if the target image frame is cropped, and is therefore not suitable for cropping. Then, an image frame with the smallest sequence number among the target image frames that is not suitable for cropping is used as the reserved image frame.

As an example, when the target video is a skincare ad with a face as the designated object, if the target video comprises 500 image frames, 250 image frames can be obtained by extracting one image frame every two frames, and then a border removal process is performed on these image frames to obtain 250 target image frames with frame numbers 1, 3, 5, . . . , 497, 499 in the target video. Thereafter, facial recognition is performed on the 250 target image frames to determine a position of the face in each target image frame. Finally, an area ratio of the face in each target image frame is determined in sequence. If the area ratio obtained is greater than 60%, it indicates that the image frame has high importance and is not suitable for cropping. If the area ratio obtained is less than or equal to 60%, it indicates that the image frame is less important and is suitable for cropping. If it is determined that out of the 250 target image frames, target image frames with frame numbers 15, 19, 21, 23 and 35 are not suitable for cropping, the target image frame with frame number 15 can be used as a reserved image frame.

In summary, the target video is first preprocessed in the present disclosure to obtain a plurality of target video frames in the target video. Then, each target video frame is recognized to obtain the position of a designated object in the target video frame. Finally, a reserved image frame is selected from the plurality of target image frames based on the position of the designated object in each target image frame, the reserved image frame being used to indicate cropping of image frames in the target image video that are before the reserved image frame. This disclosure determines the reserved image frame based on the position of the designated object in the target image frame, thereby indicating the cropping of the image frames before the reserved image frame, capable of determining reserved image frames for different target videos, and reducing information loss caused during the cropping process of the target video.

Figure 2:
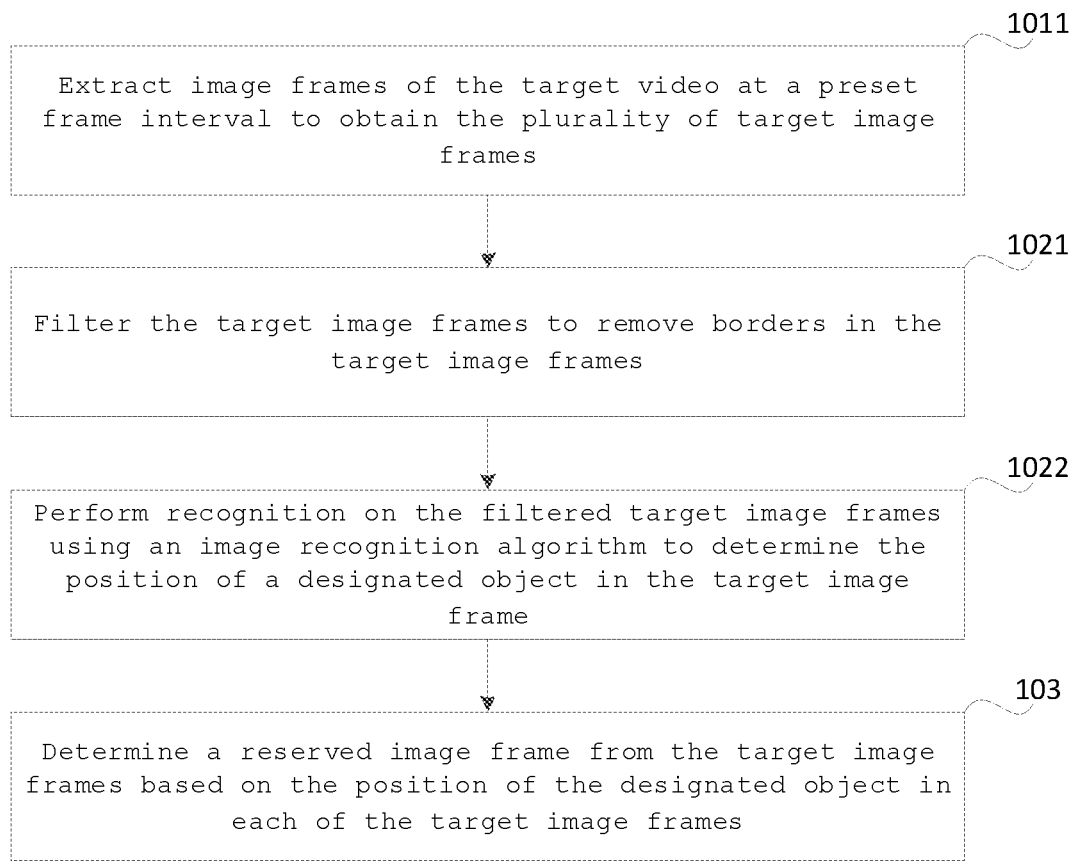
FIG. 2 is a flowchart of another video processing method according to an exemplary embodiment.

FIG. 2 is a flowchart of another video processing method according to an exemplary embodiment. As shown in FIG. 2, in some embodiments, step 101 can be implemented as step 1011.

In step 1011, image frames of the target video are extracted at a preset frame interval to obtain the plurality of target image frames.

Correspondingly, step S102 may comprise:
  step 1021: filtering the target image frames to remove borders in the target image frames;
  step 1022: performing recognition on the filtered target image frames using an image recognition algorithm to determine the position of a designated object in the target image frame, the image recognition algorithm comprising at least one of a face recognition algorithm, a text recognition algorithm, a designated identifier recognition algorithm, or a saliency detection algorithm.

For example, the preprocessing of the target video may comprise extracting image frames in the target video at a preset frame interval. For example, if the frame interval is 5, one image frame may be extracted from the target video as a target image frame every 5 image frames. When identifying the position of a designated object in each target image frame, filtering can be performed on each target image frame to remove any borders that carry no information. A preset image recognition algorithm can then be used to perform recognition on the filtered target image frame to obtain the position of the designated object in the target image frame. The designated object may comprise at least one of a face, text, a designated identifier, or a salient object, and accordingly, the image recognition algorithm may be at least one of a face recognition algorithm, a text recognition algorithm, a designated identifier recognition algorithm, or a saliency detection algorithm.

Figure 3:
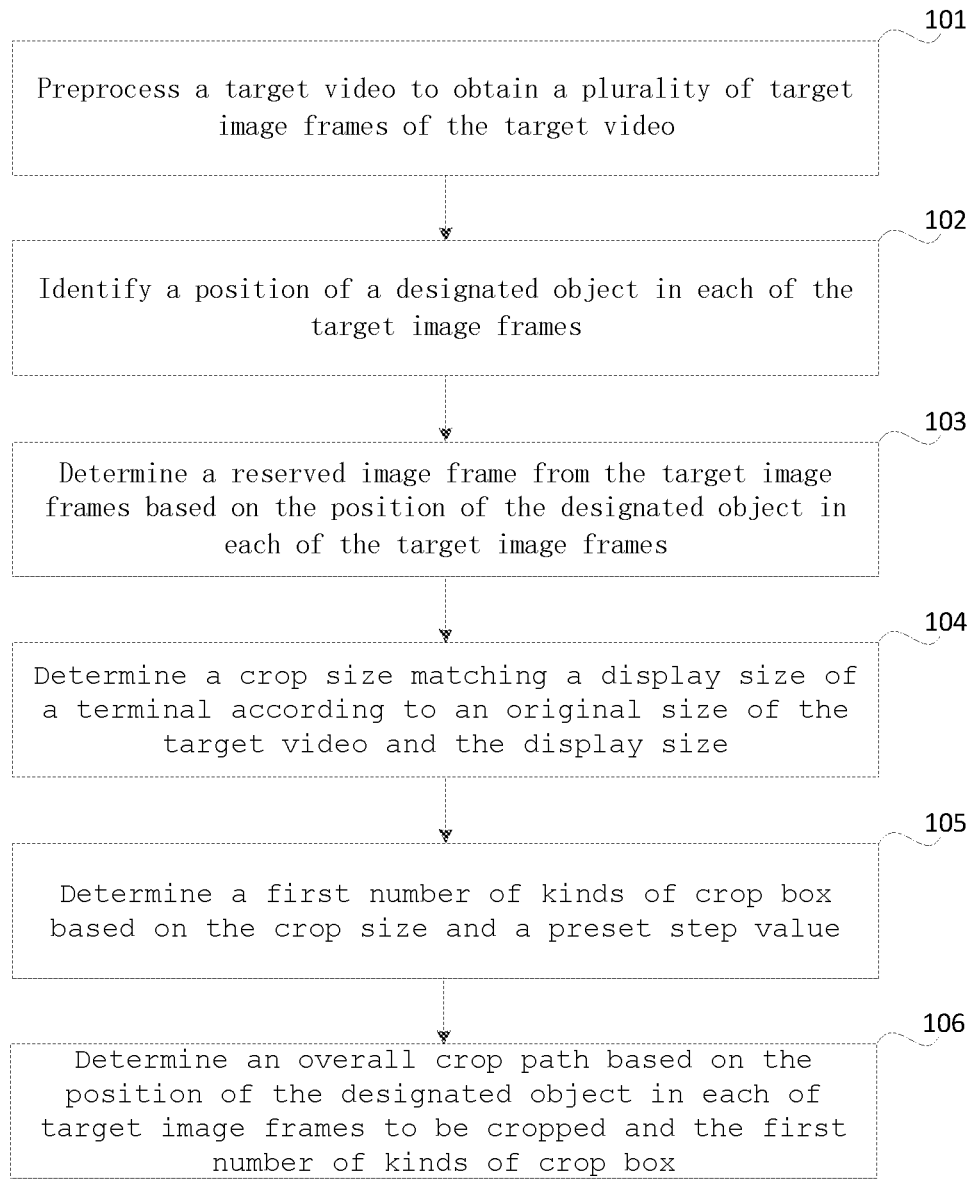
FIG. 3 is a flowchart of another video processing method according to an exemplary embodiment.

FIG. 3 is a flowchart of another video processing method according to an exemplary embodiment. As shown in FIG. 3, after step 103, the method may further comprise steps 104-106.

In step 104, a crop size matching a display size of a terminal is determined according to an original size of the target video and the display size.

In step 105, a first number of kinds of crop box are determined based on the crop size and a preset step value, each of kind of crop box having a different position on the image frames in the target video and having the crop size.

In step 106, an overall crop path is determined based on the position of the designated object in each of target image frames to be cropped and the first number of kinds of crop box, wherein the target image frames to be cropped are target image frames in the target video before the reserved image frame, and the overall crop path comprises crop boxes of the image frames in the target video before the reserved image frame.

In one application scenario, an overall crop path applicable to the target video may be further determined after determining the reserved image frame. It can be understood that the overall crop path comprises multiple crop boxes, each corresponding to an image frame in the target video before the reserved image frame, and used to indicate which part of the image frame is to be cropped and which part is to be retained when that image frame is cropped, i.e., pixels located outside the crop box are to be cropped and pixels located within the crop box are to be retained. That is to say, the overall crop path can indicate how to crop each image frame in the target video before the reserved image frame.

An exemplary description of a method for determining the overall crop path will be given below. First of all, a crop size is determined according to an original size of the target video and a display size of the terminal device. The original size of the target video can be considered as the resolution of the target video. The display size, for example, is the size of a screen of the terminal device on which the target video needs to be displayed. The crop size is, for example, a resolution that matches the display size. The matching between the crop size and the display size means that the display screen of the terminal device can directly display images at a resolution equal to the crop size. For example, if the original size is 1280*720 and the display size is 1:1, with a rule of cropping only in one of the length and width directions, the crop size can be determined to be 720*720.

Then, a first number of kinds of crop box can be determined based on the determined crop size and a preset step value, wherein the size of each crop box is the crop size and the position of each crop box on the image frames is different. It can be understood that, starting from one side of an image frame, a first of kind of crop box is first obtained, and then the first crop box is moved by one step value in a specified direction to obtain a second crop box, and then by two step values to obtain a third crop box, and so on. As an example, when the original size of the image frame is 1280*720, the crop size is 720*720, and the step value is 20 pixels, starting from the left side of an image frame, a first crop box is obtained with a range of horizontal coordinates of pixels in the first crop box of 1 to 720, and a range of vertical coordinates of 1-720. Then, the first crop box is moved 20 pixels to the right to obtain a second crop box with a range of horizontal coordinates of pixels in the second crop box of 21-740, and a range of vertical coordinates of 1-720, and so on. Therefore, a total of 29 of kinds of crop box can be obtained.

Finally, for each target image frame to be cropped, filtering can be performed using the first number of kinds of crop box to select the one with the least information loss as a crop box corresponding to that target image frame to be cropped based on the position of the designated object in the target image frame. Thus, a corresponding crop box can be obtained for each target image frame to be cropped. The target image frame to be cropped is a target image frame before the reserved image frame. Furthermore, a crop box of each target image frame in the target video before the reserved image frame can be obtained based on the corresponding crop box of each target image frame to be cropped, thereby obtaining the overall crop path. Interpolation can be performed on the crop boxes corresponding to the various target image frames to be cropped to obtain the overall crop path if the target image frames are extracted from the target video at the frame interval.

Figure 4:
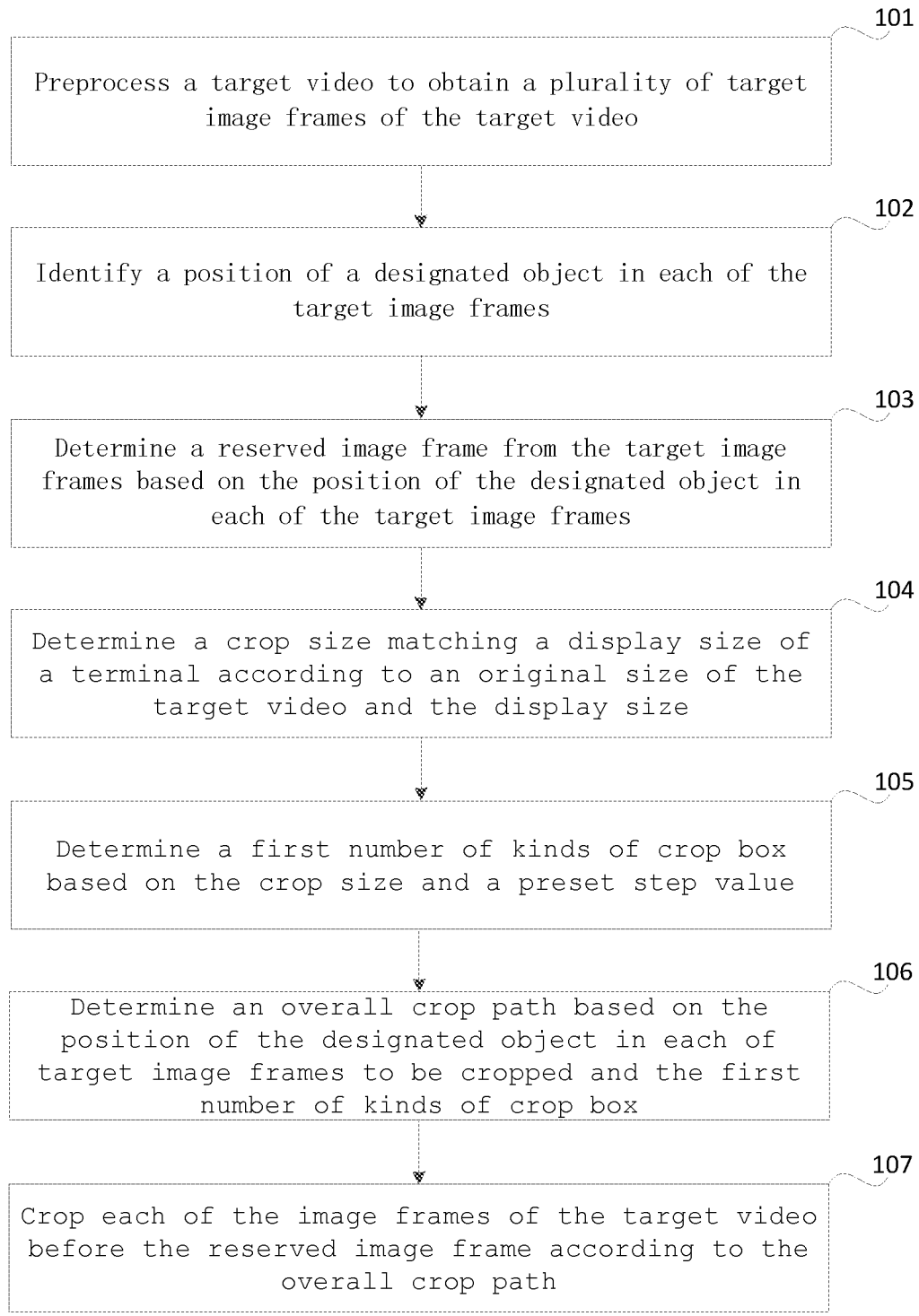
FIG. 4 is a flowchart of another video processing method according to an exemplary embodiment.

FIG. 4 is a flowchart of another video processing method according to an exemplary embodiment. As shown in FIG. 4, after step 106, the method may further comprise step 107.

In step 107, each of the image frames of the target video before the reserved image frame is cropped according to the overall crop path to obtain a first video consisting of cropped image frames and a second video consisting of un-cropped image frames.

For example, the image frames in the target video can be divided into two parts based on the reserved image frames after determining the overall crop path, the two parts comprising: a first part comprising the image frames before the reserved image frame, and a second part comprising the reserved image frame and the image frames after the reserved image frame. Those image frames in the second part form a second video, which comprises un-cropped image frames. The image frames in the first part are cropped according to the overall crop path, which means that the various image frames before the reserved image frame are cropped with the crop boxes corresponding to the corresponding image frames comprised in the overall crop path, and a first video is formed by the cropped image frames. The first video is suitable for displaying in full-screen mode on the terminal device, while the second video is suitable for displaying in its original size on the terminal device.

Figure 5:
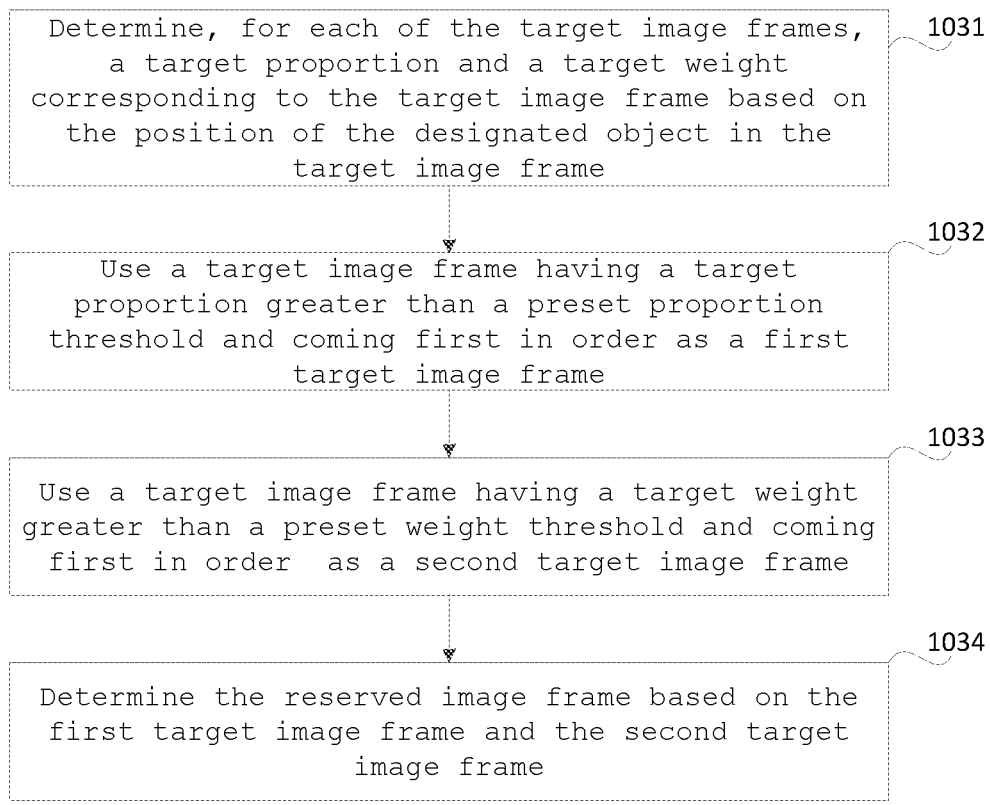
FIG. 5 is a flowchart of another video processing method according to an exemplary embodiment.

FIG. 5 is a flowchart of another video processing method according to an exemplary embodiment. As shown in FIG. 5, a plurality of target image frames are arranged in the same order as in the target video. Step 103 can be implemented as follows.

In step 1031, for each of the target image frames, a target proportion and a target weight corresponding to the target image frame are determined based on the position of the designated object in the target image frame, wherein the target proportion is used to indicate a proportion of the designated object in the target image frame, and the target weight is determined based on weights of various pixels in the target image frame.

In step 1032, a target image frame having a target proportion greater than a preset proportion threshold and coming first in order is used as a first target image frame.

In step 1033, a target image frame having a target weight greater than a preset weight threshold and coming first in order is used as a second target image frame.

In step 1034, the reserved image frame is determined based on the first target image frame and the second target image frame.

For example, a plurality of target image frames obtained in step 101 can be arranged in the same order as in the target video. It can be understood that, the plurality of target image frames are arranged according to their frame numbers. For example, if the target video comprises 500 image frames, 250 target image frames with frame numbers 1, 3, 5, . . . , 497, 499 can be obtained from the target video by extracting one frame every two frames. The target image frames can be arranged in ascending order.

For each target image frame, the target proportion and the target weight corresponding to the target image frame are first determined based on the position of the designated object in the target image frame. The target proportion is used to indicate a proportion of the designated object in the target image frame, and can be considered as a ratio of an area occupied by the designated object to an area of the target image frame. For example, if a target image frame comprises a total of 1000 pixels, and the designated object accounts for 550 pixels, the target proportion is 55%. The target proportion can also be interpreted as a proportion obtained by binarizing the target image frame based on whether a pixel belongs to a designated object, obtaining one or more connected regions, and then calculating ratio of areas of bounding rectangles of the connected regions to the area of the target image frame. The target weight is determined based on the weight of each pixel in the target image frame. It can be understood that, each pixel in the target image frame may have a weight, with pixels belonging to the designated object having high weights and pixels not belonging to the designated object having low weights, and the weights of all pixels in the target image frame can be summed and averaged to obtain the target weight. For example, in a target image frame having 500 pixels, each pixel having an initial weight value of 1, if a pixel belongs to the designated object, the weight of that pixel can be set to 2. If 300 pixels out of the 500 pixels have a weight of 2 and the remaining pixels have a weight of 1, the weights of the 500 pixels can be summed and averaged to calculate the target weight, i.e., 800/500=1.6.

Then, a first target image frame can be determined based on the target proportion and a preset proportion threshold (for example, 60%), which is a target image frame having a corresponding target proportion greater than the proportion threshold and coming first in order (i.e. having the lowest frame number) among the plurality of target image frames. In addition, a second target image frame can be determined based on the target weight and a preset weight threshold (for example, 1.3). The second target image frame is a target image frame having a corresponding target weight greater than the weight threshold and coming first in order (i.e. having the lowest frame number) among the plurality of target image frames. Finally, the reserved image frame is determined based on the first target image frame and the second target image frame.

In one implementation scenario, the way of determining the reserved image frame in step 1034 can be divided into two manners.

Manner 1: using a candidate target image frame, which is one of the first target image frame and the second target image frame that is before the other in order, as the reserved image frame if the candidate target image frame in the target video is located before a preset last image frame.

Manner 2: using the last image frame as the reserved image frame if the candidate target image frame in the target video is after the last image frame or is the last image frame.

For example, one of the first and second target image frames that precedes the other in order can be selected first. That is, one of the first and second target image frames having the smallest frame number is first determined and then used as a candidate target image frame. Then, the candidate target image frame and the preset last image frame are compared in terms of their positions in the target video, and the one that is before the other in order is used as the reserved image frame, wherein, the last image frame may be considered as the latest image frame, which can be specified in advance. In general, the target video only needs to be displayed in full-screen mode for a period of time, and the last image frame can be determined based on a maximum time it is displayed in full-screen mode. When the maximum time for full-screen display is 10 seconds and a frame rate of the target video is 30 fps, as an example, the frame number of the last image frame is 300. Then, one of the candidate target image frame and the last image frame with the lowest frame number is used as the reserved image frame.

Figure 6:
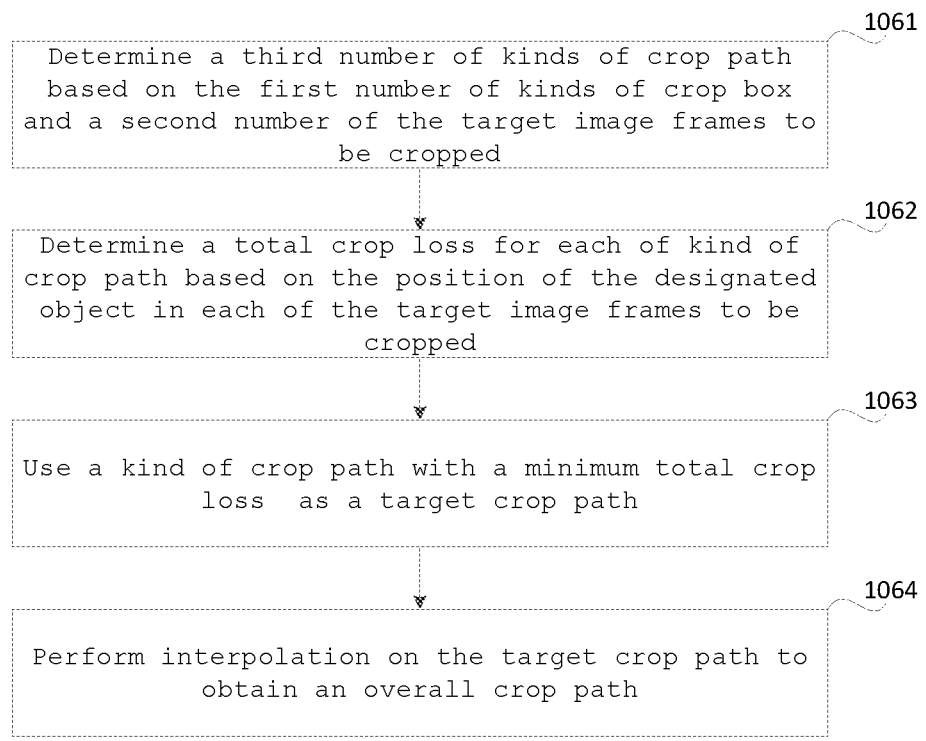
FIG. 6 is a flowchart of another video processing method according to an exemplary embodiment.

FIG. 6 is a flowchart of another video processing method according to an exemplary embodiment. As shown in FIG. 6, step 106 may comprise the following steps.

In step 1061, a third number of kinds of crop path are determined based on the first number of kinds of crop box and a second number of the target image frames to be cropped, each of kind of crop path comprising: crop boxes corresponding to various of the second number of target image frames to be cropped.

In step 1062, a total crop loss for each of kind of crop path is determined based on the position of the designated object in each of the target image frames to be cropped, the total crop loss being used to indicate a loss caused by cropping the second number of the target image frames to be cropped according to the of kind of crop path.

in Step 1063, a kind of crop path with a minimum total crop loss is used as a target crop path.

In step 1064, interpolation is performed on the target crop path to obtain an overall crop path.

A specific explanation of the method for obtaining the overall crop path will be given below. Firstly, a third number of kinds of crop path can be determined based on the first number of kinds of crop box and the second number of target image frames to be cropped. Each crop path comprises respective crop boxes of the target image frames to be cropped. The method of determining the third number can be considered as ordering and arranging the first number of kinds of crop boxes according to the second number. For example, if there are 5 of kinds of crop box and 6 target image frames to be cropped, 31250 (the third number) crop paths can be obtained. Then, a total crop loss can be separately calculated for each of those crop paths. The total crop loss is used to indicate the amount of information loss caused by cropping the second number of target image frames according to this crop path. A crop path with a minimum total crop loss is then used as a target crop path. That is to say, the target crop path is a crop path with a smallest information loss among the third number of kinds of crop paths, which can preserve the information in the target video as much as possible while dividing the target video into the first video and the second video. Finally, interpolation can be performed on the target crop path to obtain the overall crop path that comprises respective crop boxes of the image frames before the reserved image frame if the target image frames are extracted from the target video at the frame interval.

In one implementation, the total cropping loss in step 1062 can be obtained by the following steps:

step 1: determining a crop loss for each of the target image frames to be cropped according the position of the designated object in each of the target image frames to be cropped, wherein the crop loss is used to indicate a loss caused by cropping the target image frames to be cropped using crop boxes in a first crop path, the first crop path being any one of the third number of kinds of crop path;

step 2: summing the crop loss for each of the target image frames to be cropped to obtain a total crop loss corresponding to the first crop path.

Taking the first crop path as an example, cropped image frames obtained by cropping the target image frames according to the first crop path can be determined first. Then, a crop loss corresponding to the target image frame to be cropped is obtained based on each target image frame to be cropped and the corresponding cropped image frame, wherein the crop loss is used to indicate the amount of information loss caused by cropping. The crop loss may comprise three parts: an importance score, a completeness score, and a transfer score.

The method of determining the importance score may comprise: determining an importance score corresponding to the target image frame to be cropped based on the proportion of the designated object in a cropped image frame and the proportion of the designated object in the target image frame to be cropped. The following formula can be used to calculate the importance score (which can be represented as IMP):

$$IMP_i = 1 - [I(C_i)/I(O_i)]$$

wherein $IMP_i$ represents an importance score corresponding to the i-th target image frame to be cropped, $I(C_i)$ represents a proportion of the designated object in the cropped image frame corresponding to the i-th target image frame, and $I(O_i)$ represents the proportion of the designated object in the i-th target image frame to the cropped.

The method of determining the completeness score may comprise: determining a completeness score corresponding to the target image frame to be cropped based on a degree of completeness of the designated object in the cropped image frame. The completeness score can be considered as the percentage of the designated object covered by the crop box, for example, it may be the ratio of the overlapping area between the designated object and the crop box to the area of the designated object. The following formula can be used to calculate the completeness score (which can be represented as COM):

$$COM_i = \sum_{j=1}^{M} |x_{i,j} * (1 - x_{i,j})|$$

$COM_i$ represents a completeness score corresponding to the i-th target image frame to be cropped, $x_{i,j}$ represents a percentage of a j-th designated object covered by a crop box in the i-th target image frame to be cropped, and M represents a number of designated objects in the i-th target image frame to the cropped. Take the designated object being text as an example, if 10 text segments are identified in the target image frame to be cropped (i.e. M=10), a text box can be set at a position where a text segment is located, and then a ratio (i.e., $x_{i,j}$) of the overlap between the text box and a crop box to the area of the text box can be determined. For example, if an area of a text box is 100 pixels and an overlap between the text box and a crop box is 20 pixels, the percentage of the text box covered by the crop box is 20%.

The method of determining the transfer score may comprise: determining a transfer score corresponding to the target image frame to be cropped based on a distance between a first crop box and a second crop box, the first crop box being a crop box corresponding to the target image frame to be cropped comprised in the first crop path, and the second crop box being a crop box corresponding to a previous target image frame to be cropped of the target image frame to be cropped comprised in the first crop path. The following formula can be used to calculate the transfer score (which can be represented as TRA):

$$TRA_i = T(C_i) - T(C_{i-1})$$

$TRA_i$ represents a transfer score corresponding to the i-th target image frame to be cropped, $T(C_i)$ represents a coordinates of a first crop box, and $T(C_{i-1})$ represents a coordinates of a second crop box.

Furthermore, the crop loss corresponding to the target image frame to be cropped can be determined based on the importance score, the completeness score, and the transfer score corresponding to the target image frame to be cropped. The following formula can be used to calculate the crop loss (which can be represented as Loss):

$$Loss_i = \sum_{i=1}^{N} \lambda_1 IMP_i + \lambda_2 COM_i + \lambda_3 TRA_i$$

$Loss_i$ represents a crop loss corresponding to the i-th target image frame to be cropped, N represents the second number, $\lambda_1$ represents a weight corresponding to the importance score, $\lambda_2$ represents a weight corresponding to the completeness score, and $\lambda_3$ represents a weight corresponding to the transfer score.

Finally, after obtaining the respective crop losses of the target image frames to be cropped, these crop losses are summed to obtain a total crop loss corresponding to the first crop path. Then, a target crop path with a minimum total crop loss is selected from the third number of kinds of crop paths.

Figure 7:
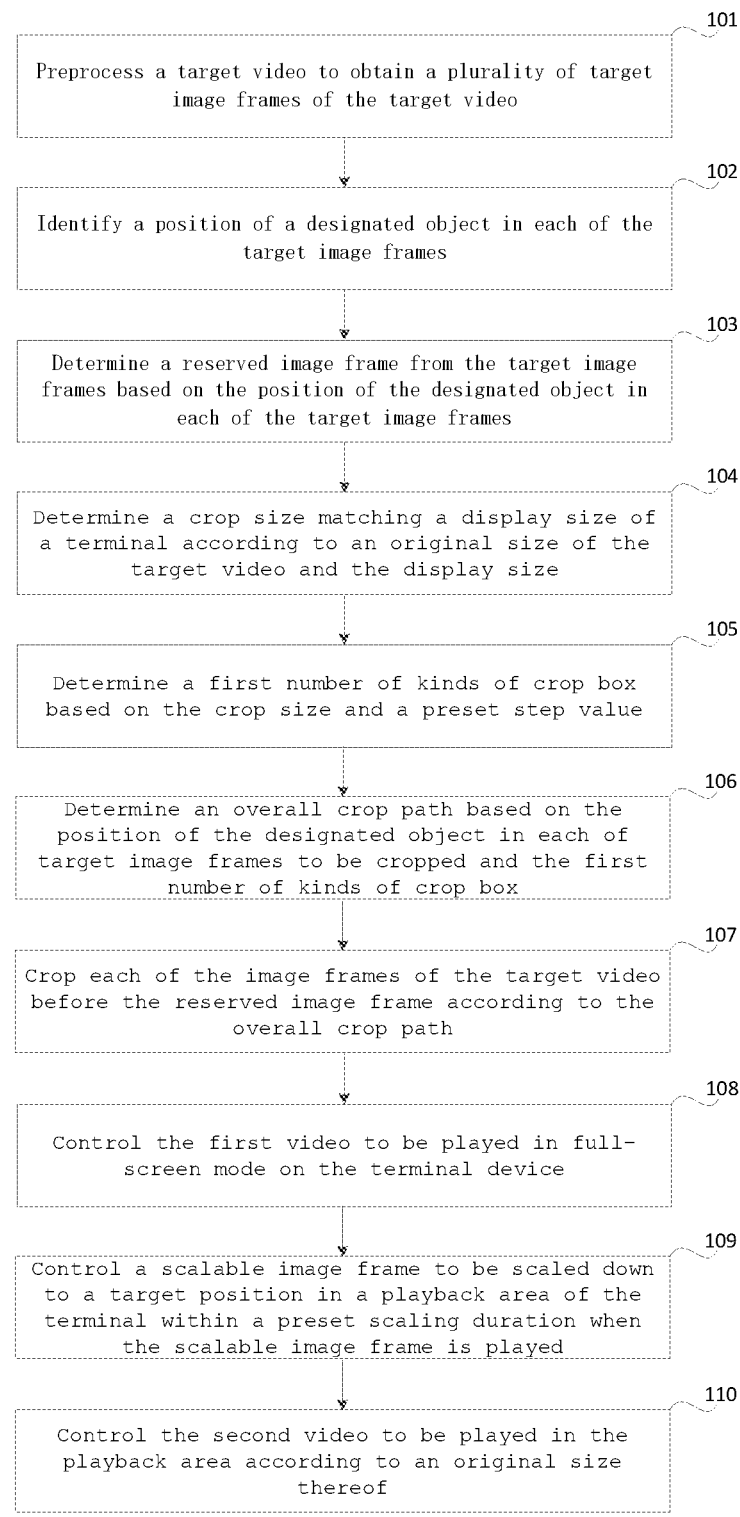
FIG. 7 is a flowchart of another video processing method according to an exemplary embodiment.

FIG. 7 is a flowchart of another video processing method according to an exemplary embodiment. As shown in FIG. 7, after step 107, the method may further comprise steps 108-110.

In step 108, the first video is controlled to be played in full-screen mode on the terminal device.

In step 109, a scalable image frame is controlled to be scaled down to a target position in a playback area of the terminal within a preset scaling duration when the scalable image frame is played. The scalable image frame is a last image frame in the first video. The target position is a position of a crop box corresponding to a pre-scaling image frame in the overall crop path in a case that the pre-scaling image frame is played in the playback area according to its original size; the pre-scaling image frame is an un-cropped image frame corresponding to the scalable image frame in the target video.

In step 110, the second video is controlled to be played in the playback area according to an original size thereof.

For example, after dividing the target video into a first video and a second video through cropping, the first video can be controlled to be played in full-screen mode on the terminal device. In this way, the information contained in the first video can be highlighted. Furthermore, when the last image frame in the first video (i.e. the scalable image frame) is played, it can be controlled to be scaled down to a target position in the playback area on the terminal device within a preset scaling duration (such as 1 second). The target position can be considered as, in the case of displaying, in the playback area, an un-cropped image frame (i.e., pre-scaling image frame) corresponding to scalable image frame in the target video according to the original size thereof, the display position of the crop box corresponding to the pre-scaling image frame in the playback area, wherein the playback area may be the middle area or another area of the display screen of the terminal device.

After scaling down the scalable image frame to the target position in the playback area of the terminal device, the second video is controlled to be played in the playback area according to an original size thereof. The first video and the second video can be linked in this way to reduce the feeling of abruptness caused by switching playback modes for image frames.

Figure 8:
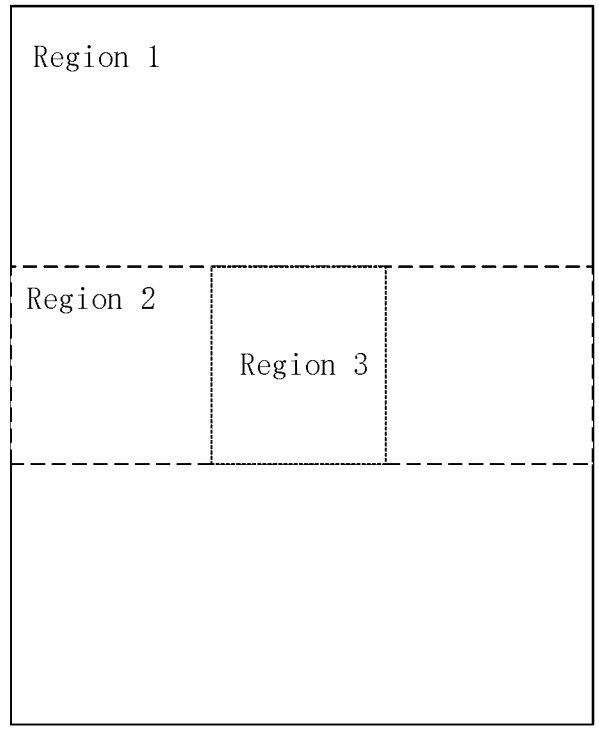
FIG. 8 is a schematic diagram of a display screen of a terminal device according to an exemplary embodiment.

Taking the display screen shown in FIG. 8 as an example, region 1 represents the entire display screen, framed by a solid line in FIG. 8, in which the first video is displayed; region 2 is the playback area, in which the pre-scaling image frame will be located if the pre-scaling image frame is controlled to be played in the original size thereof within the playback area; region 3 is the position of the crop box corresponding to the pre-scaling image frame in the overall crop path. The first video is controlled to be played in region 1 first; when the scalable image frame is played, the scalable image frame is then controlled to be scaled down from region 1 to region 3 within a scaling duration; and finally the second video is controlled to be played in region 2.

Figure 9:
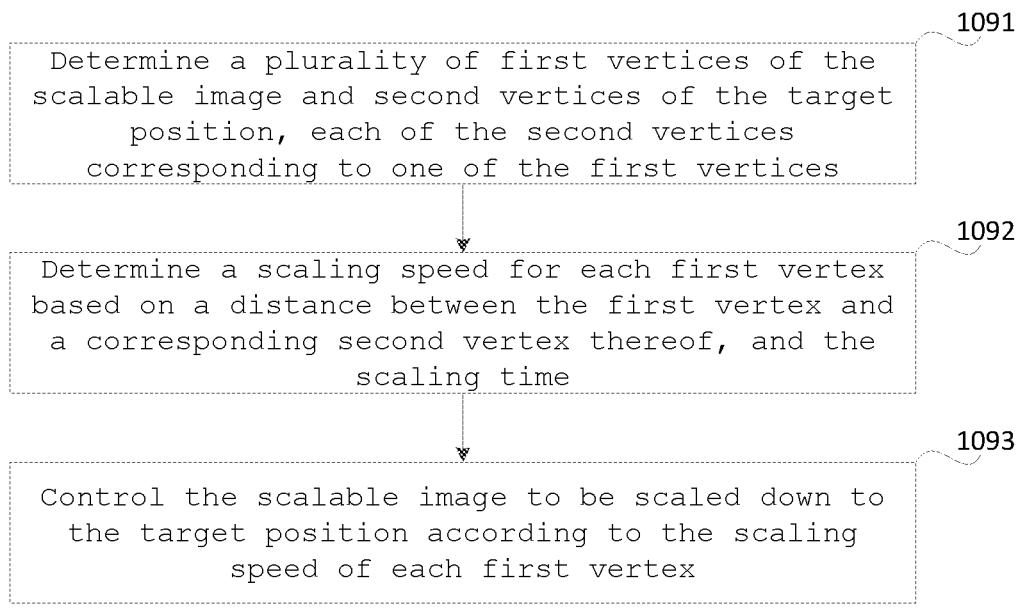
FIG. 9 is a flowchart of another video processing method according to an exemplary embodiment.

FIG. 9 is a flowchart of another video processing method according to an exemplary embodiment. As shown in FIG. 9, step 109 may comprise the following steps.

In step 1091, a plurality of first vertices of the scalable image and second vertices of the target position are determined, each of the second vertices corresponding to one of the first vertices.

In step 1092, a scaling speed for each first vertex is determined based on a distance between the first vertex and a corresponding second vertex thereof, and the scaling time.

In step 1093, the scalable image is controlled to be scaled down to the target position according to the scaling speed of each first vertex.

Figure 10:
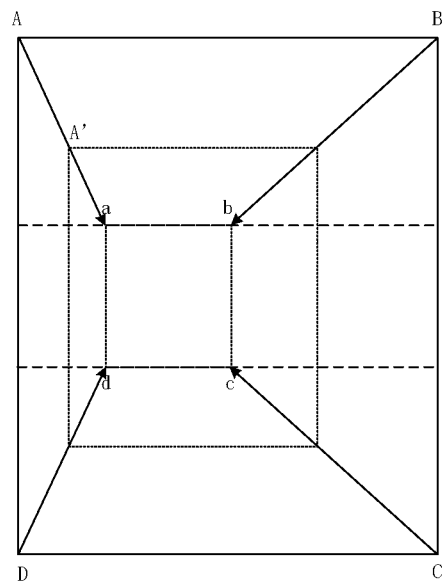
FIG. 10 is a schematic diagram of a display screen of a terminal device according to an exemplary embodiment.

In an application scenario, controlling the scalable image frame to be scaled down to the target position in the playback area of the terminal device may comprise first determining a plurality of first vertices of the scalable image and second vertices of the target position, each of the second vertices corresponding to one of the first vertices. As shown in FIG. 10, four vertices (first vertices) A, B, C, and D of the scalable image are in one-to-one correspondence with the four vertices (second vertices) a, b, c, and d of the target position. Then, a scaling speed is determined for each first vertex based on the distance between the first vertex and its corresponding second vertex, and a scaling time. Taking the first vertex A and its corresponding second vertex a as an example, dividing a length (100 pixels) of line segment Aa by a scaling time of 2 s gives a scaling speed of 50 pixels per second for the first vertex A. Finally, the scalable image is controlled to be scaled down to the target position according to the scaling speed of each first vertex. For example, at a current start time, the first vertex A of the scalable image is located at a vertex of the display screen of the terminal device. The first vertex A then moves 5 pixels forward after 10 ms, 10 pixels forward after 20 ms, and so on along the line segment Aa, wherein the first vertex A will pass through A'. It should be noted that during the process of controlling the scalable image to be scaled down to the target position, the display screen of the terminal device can display a predetermined fill color (such as black) outside the scalable image, or an application interface of a background application program, which is not limited in the present disclosure.

In summary, the target video is first preprocessed in the present disclosure to obtain a plurality of target video frames in the target video. Then, each target video frame is recognized to obtain the position of a designated object in the target video frame. Finally, a reserved image frame is selected from the plurality of target image frames based on the position of the designated object in each target image frame, the reserved image frame being used to indicate cropping of image frames in the target image video that are before the reserved image frame. This disclosure determines the reserved image frame based on the position of the designated object in the target image frame, thereby indicating the cropping of the image frames before the reserved image frame, capable of determining reserved image frames for different target videos, and reducing information loss caused during the cropping process of the target video.

Figure 11:
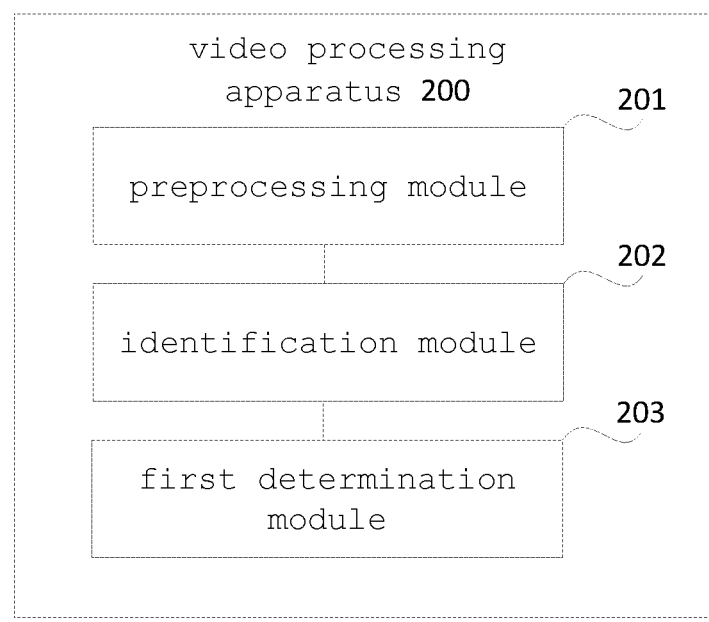
FIG. 11 is a block diagram of a video processing apparatus according to an exemplary embodiment.

FIG. 11 is a block diagram of a video processing apparatus according to an exemplary embodiment. As shown in FIG. 11, the apparatus 200 comprises:
- a preprocessing module 201 for preprocessing a target video to obtain a plurality of target image frames of the target video;
- an identification module 202 for identifying a position of a designated object in each of the target image frames;
- a first determination module 203, also known as "reserved image frame determination module", for determining a reserved image frame from the target image frames based on the position of the designated object in each of the target image frames, the reserved image frame being used to indicate a cropping on image frames before the reserved image frame in the target video.

In an implementation scenario, the designated object comprises at least one of a face, text, a designated identifier, or a salient object. The preprocessing module 201 is used for extracting image frames from the target video at a preset frame interval to obtain the plurality of target image frames.

The identification module 202 is used for, for each of the target image frames, filtering the target image frame to remove borders in the target image frame; and performing recognition on the filtered target image frame using an image recognition algorithm to determine the position of the designated object in the target image frame, the image recognition algorithm comprising at least one of a face recognition algorithm, a text recognition algorithm, a designated identifier recognition algorithm or a saliency detection algorithm.

Figure 12:
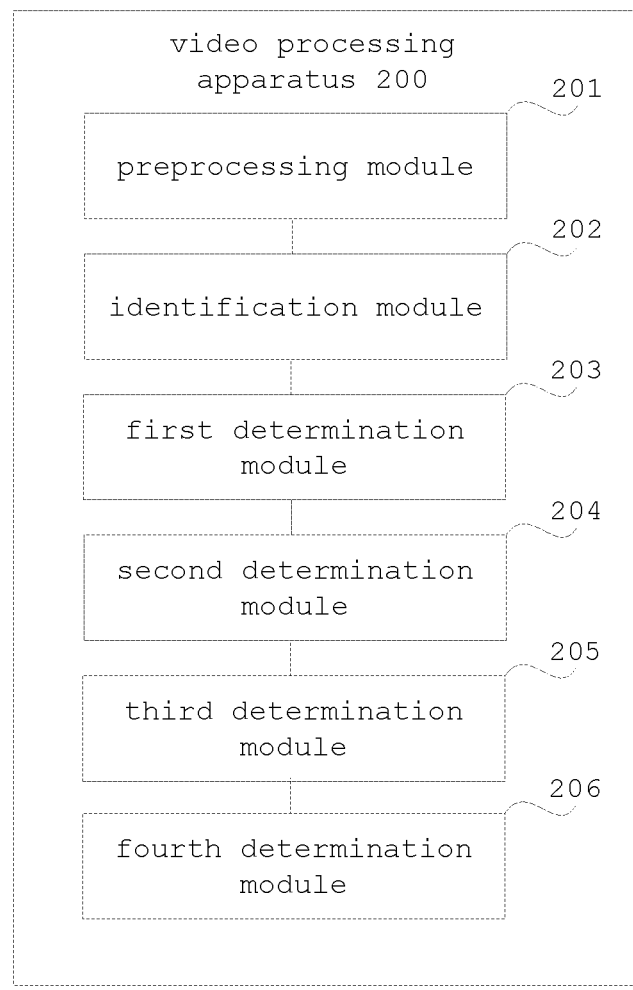
FIG. 12 is a block diagram of another video processing apparatus according to an exemplary embodiment.

FIG. 12 is a block diagram of another video processing apparatus according to an exemplary embodiment. As shown in FIG. 12, the apparatus 200 further comprises:
- a second determination module 204, also known as "crop size determination module", for determining a crop size matching a display size of a terminal device according to an original size of the target video and the display size after the determining the reserved image frame from the target image frames based on the position of the designated object in each of the target image frames;
- a third determination module 205, also known as "crop box determination module", for determining a first number of kinds of crop box based on the crop size and a preset step value, positions of the first number of kinds of crop box on the image frames in the target video being different from each and each kind of crop box having the crop size;
- a fourth determination module 206, also known as "crop path determination module", for determining an overall crop path based on the position of the designated object in each of target image frames to be cropped and the first number of kinds of crop box, wherein the target image frames to be cropped are target image frames in the target video before the reserved image frame, and the overall crop path comprises crop boxes of the image frames in the target video before the reserved image frame.

Figure 13:
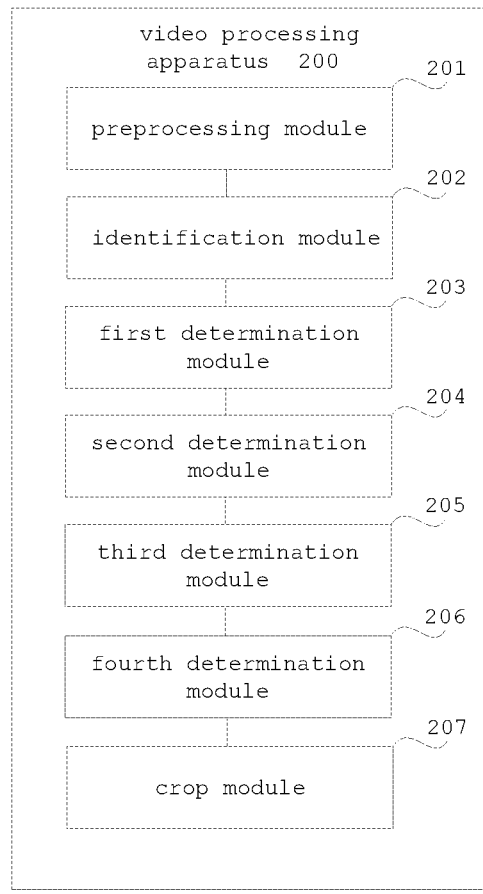
FIG. 13 is a block diagram of another video processing apparatus according to an exemplary embodiment.

FIG. 13 is a block diagram of another video processing apparatus according to an exemplary embodiment. As shown in FIG. 13, the apparatus 200 further comprises:
- a crop module 207 for cropping each of the image frames of the target video before the reserved image frame according to the overall crop path to obtain a first video consisting of cropped image frames and a second video consisting of un-cropped image frames after the determining the overall crop path based on the position of the designated object in each of target image frames to be cropped and the first number of kinds of crop box.

Figure 14:
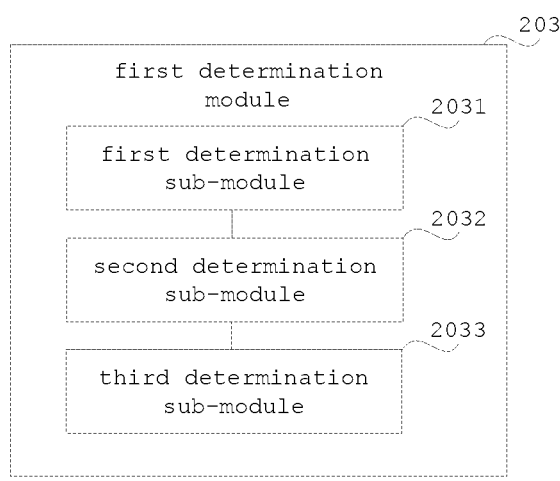
FIG. 14 is a block diagram of another video processing apparatus according to an exemplary embodiment.

FIG. 14 is a block diagram of another video processing apparatus according to an exemplary embodiment. As shown in FIG. 14, the plurality of target image frames are arranged in a same order as in the target video. The first determination module 203 may comprise:
- a first determination sub-module 2031 for, for each of the target image frames, determining a target proportion and a target weight corresponding to the target image frame based on the position of the designated object in the target image frame, wherein the target proportion is used to indicate a proportion of the designated object in the target image frame, and the target weight is determined based on weights of various pixels in the target image frame;

a second determination sub-module 2032 for using a target image frame having a target proportion greater than a preset proportion threshold and coming first in order as a first target image frame; and using a target image frame having a target weight greater than a preset weight threshold and coming first in order as a second target image frame;

a third determination sub-module 2033 for determining the reserved image frame based on the first target image frame and the second target image frame.

In one implementation scenario, the way of determining the reserved image frame in step 1034 in the third determination sub-module 2033 can be divided into two manners:

Manner 1: using a candidate target image frame, which is one of the first target image frame and the second target image frame that is before the other in order, as the reserved image frame in a case where the candidate target image frame in the target video is located before a preset last image frame.

Manner 2: using the last image frame as the reserved image frame in a case where the candidate target image frame in the target video is after the last image frame or is the last image frame.

Figure 15:
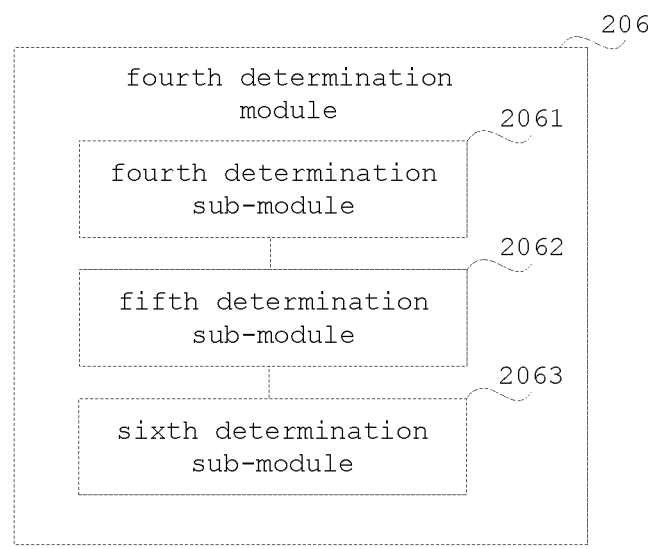
FIG. 15 is a block diagram of another video processing apparatus according to an exemplary embodiment.

FIG. 15 is a block diagram of another video processing apparatus according to an exemplary embodiment. As shown in FIG. 15, the fourth determination module 206 may comprise:

a fourth determination sub-module 2061 for determining a third number of kinds of crop path based on the first number of kinds of crop box and a second number of the target image frames to be cropped, each of kind of crop path comprising: crop boxes corresponding to various of the second number of target image frames to be cropped.

a fifth determination sub-module 2062 for determining a total crop loss for each of kind of crop path based on the position of the designated object in each of the target image frames to be cropped, the total crop loss being used to indicate a loss caused by cropping the second number of the target image frames to be cropped according to the of kind of crop path;

a sixth determination sub-module 2063 for using a kind of crop path with a minimum total crop loss as a target crop path; and performing interpolation on the target crop path to obtain the overall crop path.

In one implementation scenario, the fifth determination sub-module 2062 may be used to execute the following steps:

step 1): determining a crop loss for each of the target image frames to be cropped according the position of the designated object in each of the target image frames to be cropped, wherein the crop loss is used to indicate a loss caused by cropping the target image frames to be cropped using crop boxes in a first crop path, the first crop path being any one of the third number of kinds of crop path;

step 2): summing the crop loss for each of the target image frames to be cropped to obtain a total crop loss corresponding to the first crop path.

In some embodiments, step 1 may comprise:

step 1a): for each of the target image frames to be cropped, determining an importance score corresponding to the target image frame to be cropped based on the proportion of the designated object in a cropped image frame and the proportion of the designated object in the target image frame to be cropped, wherein the cropped image frame is an image frame obtained through cropping the target image frame to be cropped using a corresponding crop box in the first crop path;

step 1b): determining a completeness score corresponding to the target image frame to be cropped based on a degree of completeness of the designated object in the cropped image frame;

step 1c): determining a transfer score corresponding to the target image frame to be cropped based on a distance between a first crop box and a second crop box, the first crop box being a crop box corresponding to the target image frame to be cropped comprised in the first crop path, and the second crop box being a crop box corresponding to a previous target image frame to be cropped of the target image frame to be cropped comprised in the first crop path;

step 1d): determining the crop loss corresponding to the target image frame to be cropped based on the importance score, the completeness score, and the transfer score corresponding to the target image frame to be cropped.

Figure 16:
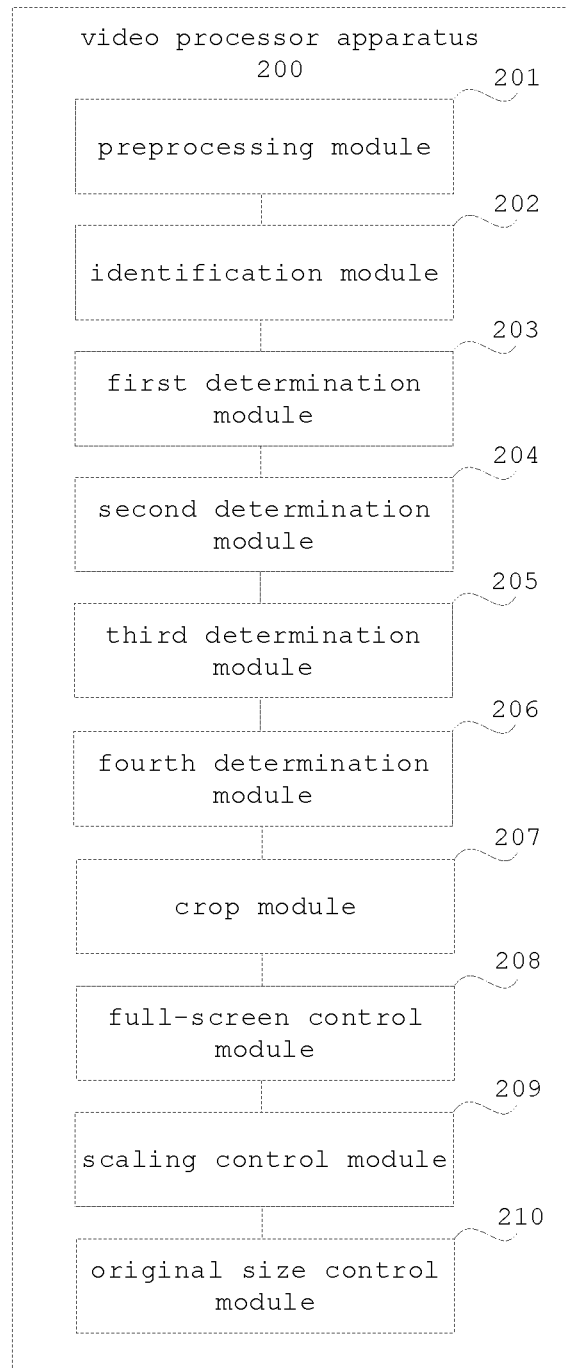
FIG. 16 is a block diagram of another video processing apparatus according to an exemplary embodiment.

FIG. 16 is a block diagram of another video processing apparatus according to an exemplary embodiment. As shown in FIG. 16, the apparatus 200 further comprises:

a full-screen control module 208 for controlling the first video to be played on the terminal device in full-screen mode after the cropping each of the image frames of the target video before the reserved image frame according to the overall crop path to obtain a first video consisting of cropped image frames and a second video consisting of un-cropped image frames;

a scaling control module 209 for controlling a scalable image frame to be scaled down to a target position in a playback area of the terminal device within a preset scaling duration when the scalable image frame is played, wherein the scalable image frame is a last image frame in the first video; the target position is a position of a crop box corresponding to a pre-scaling image frame in the overall crop path in a case that the pre-scaling image frame is played in the playback area according to its original size; the pre-scaling image frame is an un-cropped image frame corresponding to the scalable image frame in the target video;

an original size control module 210 for controlling the second video to be played in the playback area according to an original size thereof.

In one implementation scenario, the scaling control module 209 may be used for:

determining a plurality of first vertices of the scalable image and second vertices of the target position, each of the second vertices corresponding to one of the first vertices; determining a scaling speed for each first vertex based on a distance between the first vertex and a corresponding second vertex thereof, and the scaling time; and controlling the scalable image to be scaled down to the target position according to the scaling speed of each first vertex.

For the apparatus described in the above embodiment, the specific ways in which the various modules of the apparatus operate have been described in detail in the embodiments of the relevant method, and will not be explained in detail here.

In summary, the target video is first preprocessed in the present disclosure to obtain a plurality of target video frames in the target video. Then, each target video frame is recognized to obtain the position of a designated object in the target video frame. Finally, a reserved image frame is selected from the plurality of target image frames based on the position of the designated object in each target image frame, the reserved image frame being used to indicate cropping of image frames in the target image video that are before the reserved image frame. This disclosure determines the reserved image frame based on the position of the designated object in the target image frame, thereby indicating the cropping of the image frames before the reserved image frame, capable of determining reserved image frames for different target videos, and reducing information loss caused during the cropping process of the target video.

Figure 17:
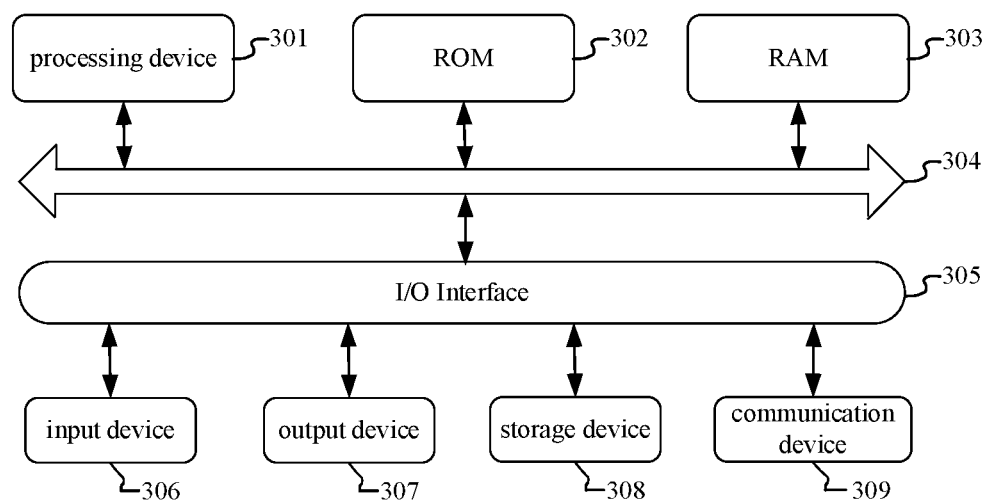
FIG. 17 is a block diagram of an electronic device according to an exemplary embodiment of the present disclosure.

Referring to FIG. 17, a structural diagram of an electronic device 300 (e.g., the executing body of the video processing method described above) suitable for implementing the embodiments of the present disclosure is shown. The electronic device in this embodiment may be a server, which may be, for example, a local server or a cloud server. The electronic device may be a terminal device, which includes, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 17 is merely an example and should not impose any limitation on the function and scope of the embodiment of the present disclosure.

As shown in FIG. 17, the electronic device 300 may include a processing device (e.g., a central processing unit, a graphics processor) 301, which may perform various appropriate actions and processes according to a program stored in Read Only Memory (ROM) 302 or a program loaded from storage device 308 into Random Access Memory (RAM) 303. In RAM 303, various programs and data required for the operation of the electronic device 300 are also stored. Processing device 301, ROM 302 and RAM 303 are connected to each other through bus 304. An input/output (I/O) interface 305 is also connected to the bus 304.

Generally, the following devices can be connected to I/O interface 305: input devices 306 including, for example, a touch screen, a touch pad, a keyboard, a mouse, a camera, a microphone, an accelerometer, a gyroscope, etc; output devices 307 including a liquid crystal display (LCD), a speaker, a vibrator, etc.; a storage device 308 such as a magnetic tape, a hard disk, etc; and a communication device 309. The communication device 309 enables the electronic device 300 to communicate wirelessly or wirelessly with other devices to exchange data. Although FIG. 17 shows the electronic device 300 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure includes a computer program product, which includes a computer program carried on a non-transitory computer readable medium, and containing program code for executing the method shown in the flowchart. In such an embodiment, the computer program may be downloaded and installed from the network through the communication device 309, or installed from the storage device 308, or from the ROM 302. When the computer program is executed by the processing device 301, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a terminal device and a server can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer-readable medium may be included in the electronic device described above; or it may exist alone without being assembled into the electronic device.

The computer-readable medium carries one or more programs that cause, when executed by the electronic device, the electronic device to perform operations of: preprocessing a target video to obtain a plurality of target image frames of the target video; identifying a position of a designated object in each of the target image frames; and determining a reserved image frame from the target image frames based on the position of the designated object in each of the target image frames, the reserved image frame being used to indicate a cropping on image frames before the reserved image frame in the target video.

The computer program code for executing operations of the present disclosure may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various of kinds of networks, including local area network (LAN) or wide area network (WAN), or connected to external computer (for example, through an Internet connection provided by an Internet service provider).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules involved in the embodiments described in the present disclosure can be implemented in software or hardware. The name of a module does not constitute a limitation of the module itself under certain circumstances, for example, a preprocessing module may also be described as "a module for acquiring target image frames".

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, there is provided a video processing method, comprising: preprocessing a target video to obtain a plurality of target image frames of the target video; identifying a position of a designated object in each of the target image frames; and determining a reserved image frame from the target image frames based on the position of the designated object in each of the target image frames, the reserved image frame being used to indicate a cropping on image frames before the reserved image frame in the target video.

According to one or more embodiments of the present disclosure, in the video processing method provided by the present disclosure, the preprocessing the target video to obtain a plurality of target image frames of the target video comprises extracting image frames from the target video at a preset frame interval to obtain the plurality of target image frames; the designated object comprises at least one of a face, text, a designated identifier, or a salient object; and the identifying the position of the designated object in each of the target image frames comprises: for each of the target image frames, filtering the target image frame to remove borders in the target image frame; and performing recognition on the filtered target image frame using an image recognition algorithm to determine the position of the designated object in the target image frame, the image recognition algorithm comprising at least one of a face recognition algorithm, a text recognition algorithm, a designated identifier recognition algorithm or a saliency detection algorithm.

According to one or more embodiments of the present disclosure, in the video processing method provided by the present disclosure, the method further comprises: determining a crop size matching a display size of a terminal device according to an original size of the target video and the display size after the determining the reserved image frame from the target image frames based on the position of the designated object in each of the target image frames; determining a first number of kinds of crop box based on the crop size and a preset step value, positions of the first number of kinds of crop box on the image frames in the target video being different from each and each kind of crop box having the crop size; and determining an overall crop path based on the position of the designated object in each of target image frames to be cropped and the first number of kinds of crop box, wherein the target image frames to be cropped are target image frames in the target video before the reserved image frame, and the overall crop path comprises crop boxes of the image frames in the target video before the reserved image frame.

According to one or more embodiments of the present disclosure, in the video processing method provided by the present disclosure, the method further comprises: cropping each of the image frames of the target video before the reserved image frame according to the overall crop path to obtain a first video consisting of cropped image frames and a second video consisting of un-cropped image frames after the determining the overall crop path based on the position of the designated object in each of target image frames to be cropped and the first number of kinds of crop box.

According to one or more embodiments of the present disclosure, in the video processing method provided by the present disclosure, the plurality of target image frames are arranged in a same order as in the target video, and the determining the reserved image frame from the target image frames based on the position of the designated object in each of the target image frames comprises: for each of the target image frames, determining a target proportion and a target weight corresponding to the target image frame based on the position of the designated object in the target image frame, wherein the target proportion is used to indicate a proportion of the designated object in the target image frame, and the target weight is determined based on weights of various pixels in the target image frame; using a target image frame having a target proportion greater than a preset proportion threshold and coming first in order as a first target image frame; using a target image frame having a target weight greater than a preset weight threshold and coming first in order as a second target image frame; and determining the reserved image frame based on the first target image frame and the second target image frame.

According to one or more embodiments of the present disclosure, in the video processing method provided by the present disclosure, the determining the reserved image frame based on the first target image frame and the second target image frame comprises: using a candidate target image frame, which is one of the first target image frame and the second target image frame that is before the other in order, as the reserved image frame in a case where the candidate target image frame in the target video is located before a preset last image frame; and using the last image frame as the reserved image frame in a case where the candidate target image frame in the target video is after the last image frame or is the last image frame.

According to one or more embodiments of the present disclosure, in the video processing method provided by the present disclosure, the determining the overall crop path based on the position of the designated object in each of target image frames to be cropped and the first number of kinds of crop box comprises: determining a third number of kinds of crop path based on the first number of kinds of crop box and a second number of the target image frames to be cropped, each of kind of crop path comprising: crop boxes corresponding to various of the second number of target image frames to be cropped; determining a total crop loss for each of kind of crop path based on the position of the designated object in each of the target image frames to be cropped, the total crop loss being used to indicate a loss caused by cropping the second number of the target image frames to be cropped according to the of kind of crop path; using a kind of crop path with a minimum total crop loss as a target crop path; and performing interpolation on the target crop path to obtain the overall crop path.

According to one or more embodiments of the present disclosure, in the video processing method provided by the present disclosure, the determining the total crop loss for each of kind of crop path based on the position of the designated object in each of the target image frames to be cropped comprises: determining a crop loss for each of the target image frames to be cropped according the position of the designated object in each of the target image frames to be cropped, wherein the crop loss is used to indicate a loss caused by cropping the target image frames to be cropped using crop boxes in a first crop path, the first crop path being any one of the third number of kinds of crop path; and summing the crop loss for each of the target image frames to be cropped to obtain a total crop loss corresponding to the first crop path.

According to one or more embodiments of the present disclosure, in the video processing method provided by the present disclosure, the determining the crop loss for each of the target image frames to be cropped according the position of the designated object in each of the target image frames to be cropped comprises: for each of the target image frames to be cropped, determining an importance score corresponding to the target image frame to be cropped based on the proportion of the designated object in a cropped image frame and the proportion of the designated object in the target image frame to be cropped, wherein the cropped image frame is an image frame obtained through cropping the target image frame to be cropped using a corresponding crop box in the first crop path; determining a completeness score corresponding to the target image frame to be cropped based on a degree of completeness of the designated object in the cropped image frame; determining a transfer score corresponding to the target image frame to be cropped based on a distance between a first crop box and a second crop box, the first crop box being a crop box corresponding to the target image frame to be cropped comprised in the first crop path, and the second crop box being a crop box corresponding to a previous target image frame to be cropped of the target image frame to be cropped comprised in the first crop path; and determining the crop loss corresponding to the target image frame to be cropped based on the importance score, the completeness score, and the transfer score corresponding to the target image frame to be cropped.

According to one or more embodiments of the present disclosure, in the video processing method provided by the present disclosure, the method further comprises: controlling the first video to be played on the terminal device in full-screen mode after the cropping each of the image frames of the target video before the reserved image frame according to the overall crop path to obtain a first video consisting of cropped image frames and a second video consisting of un-cropped image frames; controlling a scalable image frame to be scaled down to a target position in a playback area of the terminal device within a preset scaling duration when the scalable image frame is played, wherein the scalable image frame is a last image frame in the first video; the target position is a position of a crop box corresponding to a pre-scaling image frame in the overall crop path in a case that the pre-scaling image frame is played in the playback area according to its original size; the pre-scaling image frame is an un-cropped image frame corresponding to the scalable image frame in the target video; and controlling the second video to be played in the playback area according to an original size thereof.

According to one or more embodiments of the present disclosure, in the video processing method provided by the present disclosure, the controlling to scale a scalable image frame down to a target position in a playback area of the terminal device within a preset scaling duration comprises: determining a plurality of first vertices of the scalable image and second vertices of the target position, each of the second vertices corresponding to one of the first vertices; determining a scaling speed for each first vertex based on a distance between the first vertex and a corresponding second vertex thereof, and the scaling time; and controlling the scalable image to be scaled down to the target position according to the scaling speed of each first vertex.

According to one or more embodiments of the present disclosure, there is provided a video processing apparatus, comprising: a preprocessing module for preprocessing a target video to obtain a plurality of target image frames of the target video; an identification module for identifying a position of a designated object in each of the target image frames; and a first determination module for determining a reserved image frame from the target image frames based on the position of the designated object in each of the target image frames, the reserved image frame being used to indicate a cropping on image frames before the reserved image frame in the target video.

According to one or more embodiments of the present disclosure, there is provided a non-transitory computer-readable storage medium stored thereon a computer program that, when executed by a processing device, carries out the steps of the methods described in Example 1 to Example 11.

According to one or more embodiments of the present disclosure, there is provided an electronic device, comprising: one or more processors; a memory for storing one or more programs, which when executed by the one or more processors cause the one or more processors to implement any one of the aforementioned video processing methods.

According to one or more embodiments of the present disclosure, there is provided a computer program, comprising: instructions that, when executed by a processor, cause the processor to execute any one of the aforementioned video processing methods.

According to one or more embodiments of the present disclosure, there is provided a computer program product comprising instructions that, when executed by a processor, cause the processor to execute any one of the aforementioned video processing methods.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatus described in the above embodiment, the specific ways in which the various modules of the apparatus operate have been described in detail in the embodiments of the relevant method, and will not be explained in detail here.

What is claimed is:

1. A video processing method, comprising:
preprocessing a target video to obtain a plurality of target image frames of the target video, wherein the plurality of target image frames are arranged in a same order as in the target video;
identifying a position of a designated object in each of the target image frames; and
determining a reserved image frame from the target image frames based on the position of the designated object in each of the target image frames, comprising:
for each of the target image frames, determining a target proportion and a target weight corresponding to the target image frame based on the position of the designated object in the target image frame, wherein the target proportion is used to indicate a proportion of the designated object in the target image frame, and the target weight is determined based on weights of various pixels in the target image frame;
using a target image frame having a target proportion greater than a preset proportion threshold and coming first in order as a first target image frame;
using a target image frame having a target weight greater than a preset weight threshold and coming first in order as a second target image frame; and
determining the reserved image frame based on the first target image frame and the second target image frame, the reserved image frame being used to indicate a cropping on image frames before the reserved image frame in the target video.

2. The video processing method according to claim 1, wherein:
the preprocessing the target video to obtain a plurality of target image frames of the target video comprises extracting image frames from the target video at a preset frame interval to obtain the plurality of target image frames;
the designated object comprises at least one of a face, text, a designated identifier, or a salient object; and
the identifying the position of the designated object in each of the target image frames comprises:
for each of the target image frames, filtering the target image frame to remove borders in the target image frame; and
performing recognition on the filtered target image frame using an image recognition algorithm to determine the position of the designated object in the target image frame, the image recognition algorithm comprising at least one of a face recognition algorithm, a text recognition algorithm, a designated identifier recognition algorithm or a saliency detection algorithm.

3. The video processing method according to claim 1, further comprising:
determining a crop size matching a display size of a terminal device according to an original size of the target video and the display size after the determining the reserved image frame from the target image frames based on the position of the designated object in each of the target image frames;
determining a first number of kinds of crop box based on the crop size and a preset step value, positions of the first number of kinds of crop box on the image frames in the target video being different from each and each kind of crop box having the crop size; and
determining an overall crop path based on the position of the designated object in each of target image frames to be cropped and the first number of kinds of crop box, wherein the target image frames to be cropped are target image frames in the target video before the reserved image frame, and the overall crop path comprises crop boxes of the image frames in the target video before the reserved image frame.

4. The video processing method according to claim 3, further comprising:

cropping each of the image frames of the target video before the reserved image frame according to the overall crop path to obtain a first video consisting of cropped image frames and a second video consisting of un-cropped image frames after the determining the overall crop path based on the position of the designated object in each of target image frames to be cropped and the first number of kinds of crop box.

5. The video processing method according to claim 4, further comprising:

controlling the first video to be played on the terminal device in full-screen mode after the cropping each of the image frames of the target video before the reserved image frame according to the overall crop path to obtain a first video consisting of cropped image frames and a second video consisting of un-cropped image frames;

controlling a scalable image frame to be scaled down to a target position in a playback area of the terminal device within a preset scaling duration when the scalable image frame is played, wherein the scalable image frame is a last image frame in the first video; the target position is a position of a crop box corresponding to a pre-scaling image frame in the overall crop path in a case that the pre-scaling image frame is played in the playback area according to its original size; the pre-scaling image frame is an un-cropped image frame corresponding to the scalable image frame in the target video; and controlling the second video to be played in the playback area according to an original size thereof.

6. The video processing method according to claim 5, wherein the controlling to scale a scalable image frame down to a target position in a playback area of the terminal device within a preset scaling duration comprises:

determining a plurality of first vertices of the scalable image and second vertices of the target position, each of the second vertices corresponding to one of the first vertices;

determining a scaling speed for each first vertex based on a distance between the first vertex and a corresponding second vertex thereof, and the scaling time; and controlling the scalable image to be scaled down to the target position according to the scaling speed of each first vertex.

7. The video processing method according to claim 3, wherein the determining the overall crop path based on the position of the designated object in each of target image frames to be cropped and the first number of kinds of crop box comprises:

determining a third number of kinds of crop path based on the first number of kinds of crop box and a second number of the target image frames to be cropped, each of kind of crop path comprising: crop boxes corresponding to various of the second number of target image frames to be cropped;

determining a total crop loss for each of kind of crop path based on the position of the designated object in each of the target image frames to be cropped, the total crop loss being used to indicate a loss caused by cropping the second number of the target image frames to be cropped according to the of kind of crop path;

using a kind of crop path with a minimum total crop loss as a target crop path; and performing interpolation on the target crop path to obtain the overall crop path.

8. The video processing method according to claim 7, wherein the determining the total crop loss for each of kind of crop path based on the position of the designated object in each of the target image frames to be cropped comprises:

determining a crop loss for each of the target image frames to be cropped according the position of the designated object in each of the target image frames to be cropped, wherein the crop loss is used to indicate a loss caused by cropping the target image frames to be cropped using crop boxes in a first crop path, the first crop path being any one of the third number of kinds of crop path; and summing the crop loss for each of the target image frames to be cropped to obtain a total crop loss corresponding to the first crop path.

9. The video processing method according to claim 8, wherein the determining the crop loss for each of the target image frames to be cropped according the position of the designated object in each of the target image frames to be cropped comprises:

for each of the target image frames to be cropped, determining an importance score corresponding to the target image frame to be cropped based on the proportion of the designated object in a cropped image frame and the proportion of the designated object in the target image frame to be cropped, wherein the cropped image frame is an image frame obtained through cropping the target image frame to be cropped using a corresponding crop box in the first crop path;

determining a completeness score corresponding to the target image frame to be cropped based on a degree of completeness of the designated object in the cropped image frame;

determining a transfer score corresponding to the target image frame to be cropped based on a distance between a first crop box and a second crop box, the first crop box being a crop box corresponding to the target image frame to be cropped comprised in the first crop path, and the second crop box being a crop box corresponding to a previous target image frame to be cropped of the target image frame to be cropped comprised in the first crop path; and determining the crop loss corresponding to the target image frame to be cropped based on the importance score, the completeness score, and the transfer score corresponding to the target image frame to be cropped.

10. The video processing method according to claim 1, wherein the determining the reserved image frame based on the first target image frame and the second target image frame comprises:

using a candidate target image frame, which is one of the first target image frame and the second target image frame that is before the other in order, as the reserved image frame in a case where the candidate target image frame in the target video is located before a preset last image frame; and using the last image frame as the reserved image frame in a case where the candidate target image frame in the target video is after the last image frame or is the last image frame.

11. A non-transitory computer-readable storage medium stored thereon a computer program that, when executed by a processing device, executes the steps of the video processing method according to claim 1.

12. An electronic device, comprising:
memory; and
a processor coupled to the memory, the processor configured to execute the video processing method for performing instructions comprising:
preprocessing a target video to obtain a plurality of target image frames of the target video, wherein the plurality of target image frames are arranged in a same order as in the target video;
identifying a position of a designated object in each of the target image frames; and
determining a reserved image frame from the target image frames based on the position of the designated object in each of the target image frames, comprising:
for each of the target image frames, determining a target proportion and a target weight corresponding to the target image frame based on the position of the designated object in the target image frame, wherein the target proportion is used to indicate a proportion of the designated object in the target image frame, and the target weight is determined based on weights of various pixels in the target image frame;
using a target image frame having a target proportion greater than a preset proportion threshold and coming first in order as a first target image frame;
using a target image frame having a target weight greater than a preset weight threshold and coming first in order as a second target image frame; and
determining the reserved image frame based on the first target image frame and the second target image frame, the reserved image frame being used to indicate a cropping on image frames before the reserved image frame in the target video.

13. The electronic device according to claim 12, wherein:
the preprocessing the target video to obtain a plurality of target image frames of the target video comprises:
extracting image frames from the target video at a preset frame interval to obtain the plurality of target image frames;
the designated object comprises at least one of a face, text, a designated identifier, or a salient object; and
the identifying the position of the designated object in each of the target image frames comprises:
for each of the target image frames, filtering the target image frame to remove borders in the target image frame; and
performing recognition on the filtered target image frame using an image recognition algorithm to determine the position of the designated object in the target image frame, the image recognition algorithm comprising at least one of a face recognition algorithm, a text recognition algorithm, a designated identifier recognition algorithm or a saliency detection algorithm.

14. The electronic device according to claim 12, wherein the processor is further configured to execute the video processing method for performing instructions comprising:
determining a crop size matching a display size of a terminal device according to an original size of the target video and the display size after the determining the reserved image frame from the target image frames based on the position of the designated object in each of the target image frames;
determining a first number of kinds of crop box based on the crop size and a preset step value, positions of the first number of kinds of crop box on the image frames in the target video being different from each and each kind of crop box having the crop size; and
determining an overall crop path based on the position of the designated object in each of target image frames to be cropped and the first number of kinds of crop box, wherein the target image frames to be cropped are target image frames in the target video before the reserved image frame, and the overall crop path comprises crop boxes of the image frames in the target video before the reserved image frame.

15. The electronic device according to claim 14, wherein the processor is further configured to execute the video processing method for performing instructions comprising:
cropping each of the image frames of the target video before the reserved image frame according to the overall crop path to obtain a first video consisting of cropped image frames and a second video consisting of un-cropped image frames after the determining the overall crop path based on the position of the designated object in each of target image frames to be cropped and the first number of kinds of crop box.

16. The electronic device according to claim 15, wherein the processor is further configured to execute the video processing method for performing instructions comprising:
controlling the first video to be played on the terminal device in full-screen mode after the cropping each of the image frames of the target video before the reserved image frame according to the overall crop path to obtain a first video consisting of cropped image frames and a second video consisting of un-cropped image frames;
controlling a scalable image frame to be scaled down to a target position in a playback area of the terminal device within a preset scaling duration when the scalable image frame is played, wherein the scalable image frame is a last image frame in the first video; the target position is a position of a crop box corresponding to a pre-scaling image frame in the overall crop path in a case that the pre-scaling image frame is played in the playback area according to its original size; the pre-scaling image frame is an un-cropped image frame corresponding to the scalable image frame in the target video; and
controlling the second video to be played in the playback area according to an original size thereof.

17. The electronic device according to claim 14, wherein the determining the overall crop path based on the position of the designated object in each of target image frames to be cropped and the first number of kinds of crop box comprises:
determining a third number of kinds of crop path based on the first number of kinds of crop box and a second number of the target image frames to be cropped, each of kind of crop path comprising: crop boxes corresponding to various of the second number of target image frames to be cropped;
determining a total crop loss for each of kind of crop path based on the position of the designated object in each of the target image frames to be cropped, the total crop loss being used to indicate a loss caused by cropping the second number of the target image frames to be cropped according to the of kind of crop path;
using a kind of crop path with a minimum total crop loss as a target crop path; and
performing interpolation on the target crop path to obtain the overall crop path.

18. The electronic device according to claim 17, wherein the determining the total crop loss for each of kind of crop path based on the position of the designated object in each of the target image frames to be cropped comprises:

determining a crop loss for each of the target image frames to be cropped according the position of the designated object in each of the target image frames to be cropped, wherein the crop loss is used to indicate a loss caused by cropping the target image frames to be cropped using crop boxes in a first crop path, the first crop path being any one of the third number of kinds of crop path; and summing the crop loss for each of the target image frames to be cropped to obtain a total crop loss corresponding to the first crop path.

19. The electronic device according to claim 18, wherein the determining the crop loss for each of the target image frames to be cropped according the position of the designated object in each of the target image frames to be cropped comprises:

for each of the target image frames to be cropped, determining an importance score corresponding to the target image frame to be cropped based on the proportion of the designated object in a cropped image frame and the proportion of the designated object in the target image frame to be cropped, wherein the cropped image frame is an image frame obtained through cropping the target image frame to be cropped using a corresponding crop box in the first crop path;

determining a completeness score corresponding to the target image frame to be cropped based on a degree of completeness of the designated object in the cropped image frame;

determining a transfer score corresponding to the target image frame to be cropped based on a distance between a first crop box and a second crop box, the first crop box being a crop box corresponding to the target image frame to be cropped comprised in the first crop path, and the second crop box being a crop box corresponding to a previous target image frame to be cropped of the target image frame to be cropped comprised in the first crop path; and determining the crop loss corresponding to the target image frame to be cropped based on the importance score, the completeness score, and the transfer score corresponding to the target image frame to be cropped.

20. The electronic device according to claim 12, wherein the determining the reserved image frame based on the first target image frame and the second target image frame comprises:

using a candidate target image frame, which is one of the first target image frame and the second target image frame that is before the other in order, as the reserved image frame in a case where the candidate target image frame in the target video is located before a preset last image frame; and using the last image frame as the reserved image frame in a case where the candidate target image frame in the target video is after the last image frame or is the last image frame.

* * * * *